US010692008B2

(12) United States Patent
Nakazawa et al.

(10) Patent No.: US 10,692,008 B2
(45) Date of Patent: Jun. 23, 2020

(54) ASSESSING AND SELECTING DECISION MAKING ENTITIES FOR ACQUIRING AND PRESENTING INFORMATION

(71) Applicant: FUJITSU LIMITED, Kawasaki-shi, Kanagawa (JP)

(72) Inventors: Katsuhito Nakazawa, Urawa (JP); Tetsuyoshi Shiota, Yokohama (JP); Hiroshi Chiba, Aikawa (JP); Tomoko Nagano, Isehara (JP); Hidemichi Fujii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1002 days.

(21) Appl. No.: 15/137,346

(22) Filed: Apr. 25, 2016

(65) Prior Publication Data

US 2016/0239747 A1 Aug. 18, 2016

Related U.S. Application Data

(63) Continuation of application No. PCT/JP2014/078962, filed on Oct. 30, 2014.

(30) Foreign Application Priority Data

Oct. 31, 2013 (JP) ................................. 2013-227492

(51) Int. Cl.
*G06N 5/04* (2006.01)
*G06Q 10/06* (2012.01)
*G06Q 50/26* (2012.01)

(52) U.S. Cl.
CPC ......... *G06N 5/043* (2013.01); *G06Q 10/0639* (2013.01); *G06Q 50/26* (2013.01)

(58) Field of Classification Search
CPC ........................... G06Q 50/26; G06Q 10/0639
See application file for complete search history.

(56) References Cited

U.S. PATENT DOCUMENTS

2013/0226824 A1* 8/2013 Wilson ................. G06Q 50/188
705/342

FOREIGN PATENT DOCUMENTS

JP 2001-147937 5/2001
JP 2002-334185 11/2002
(Continued)

OTHER PUBLICATIONS

Ricci, Francesco et al.; Recommender Systems Handbook; 2010 Springer; 847 pages. (Year: 2010).*

(Continued)

*Primary Examiner* — Stanley K. Hill
(74) *Attorney, Agent, or Firm* — Fujitsu Patent Center

(57) ABSTRACT

An information presentation device includes a processor that executes a procedure. The procedure includes: for respective decision making entities, calculating assessment indexes of a plurality of respective assessment criteria, based on characteristic information representing a characteristic of each of the decision making entities; selecting, from the plurality of decision making entities, at least one decision making entity having a characteristic similar to that of an information presentation target decision making entity that is a target of information presentation, based on an assessment index calculated for each of the decision making entities; and acquiring and presenting information related to decision making by the selected decision making entity from a storage section storing information related to decision making for each of the plurality of decision making entities.

16 Claims, 16 Drawing Sheets

(56) References Cited

FOREIGN PATENT DOCUMENTS

| JP | 2004-355502 | 12/2004 |
| JP | 2005-332350 | 12/2005 |
| JP | 2006-146735 | 6/2006 |
| JP | 2013-080451 | 5/2013 |
| WO | 0146876 | 6/2001 |

OTHER PUBLICATIONS

Jannach, Dietmar et al.; Tutorial: Recommender Systems; 2011 International Joint Conference on Artificial Intelligence; pp. 1-128. (Year: 2011).*
EPOA—Office Action of European Patent Application No. 14858554.0 dated May 24, 2018. ***All references cited in the EPOA was previously submitted in the IDS filed on Apr. 25, 2016.
EPOA—Communication from the EPO for European Patent Application No. 14858554.0 dated Nov. 2, 2017. **All references cited in the EPOA were previously submitted in the IDS filed on Apr. 25, 2016.
International Search Report and Written Opinion of the International Searching Authority (Form PCT/ISA/210, Form PCT/ISA/237), mailed in connection with PCT/JP2014/078962 dated Feb. 3, 2015 (11 pages).
JPOA—Office Action of Japanese Patent Application No. 2015-545307 dated May 23, 2017, with full Machine Translation of the Office Action. **All references cited in the JPOA were previously submitted in the IDS filed on Apr. 25, 2016.
EPOA—Office Action of European Patent Application No. 14858554.0 dated Mar. 17, 2017. **All references cited in the EPOA were previously submitted in the IDS filed on Apr. 25, 2016.

* cited by examiner

FIG.2

| LOCAL GOVERNMENT BODY ID | LOCAL GOVERNMENT BODY NAME | TYPE OF CHARACTERISTIC INFORMATION | | OBSERVED VALUE |
|---|---|---|---|---|
| 01 | AAA CITY | BASIC INFORMATION | INDUSTRIAL STRUCTURE | 2013 – PRIMARY INDUSTRY: 0.1%, SECONDARY INDUSTRY: 25.3%, TERTIARY INDUSTRY: 74.6% <br> 2012 – ... <br> 2011 – ... <br> ... |
| | | | DEMOGRAPHIC COMPOSITION | 2013 – UNDER 15 YEARS OLD: 13%, FROM 15 TO 65 YEARS OLD: 69%, 65 YEARS OLD AND OVER: 18% <br> 2012 – ... <br> 2011 – ... <br> ... |
| | | | POPULATION | 2013 – 1,440,124 PEOPLE <br> 2012 – 1,431,409 PEOPLE <br> 2011 – ... <br> ... |
| | | SUPPLEMENTARY INFORMATION | NUMBER OF RECOGNIZED CRIMINAL OFFENSES | 2013 – 11,536 CASES <br> 2012 – 12,965 CASES <br> 2011 – ... <br> ... |
| | | | ... | ... |
| 02 | BBB City | BASIC INFORMATION | INDUSTRIAL STRUCTURE | ... |
| | | | DEMOGRAPHIC COMPOSITION | ... |
| | | SUPPLEMENTARY INFORMATION | | |
| ... | | | | |

| LOCAL GOVERNMENT BODY ID | LOCAL GOVERNMENT BODY NAME | ASSESSMENT CRITERIA | TARGET VALUE | MINIMUM STANDARD |
|---|---|---|---|---|
| 01 | AAA CITY | SAFETY/SECURITY | 12,9000 CASES | - |
|  |  | ... | ... | ... |
| 02 | BBB CITY | ... | ... | ... |
| ... | ... | ... | ... | ... |

| ASSESSMENT CRITERIA | CHARACTERISTIC INFORMATION TO BE EMPLOYED |
|---|---|
| SAFETY/SECURITY | NUMBER OF RECOGNIZED CRIMINAL OFFENSES, POPULATION |
| HEALTH | ... |
| ... | ... |

| LOCAL GOVERNMENT BODY ID | LOCAL GOVERNMENT BODY NAME | ASSESSMENT CRITERIA | SUBJECTIVE ASSESSMENT INDEX | OBJECTIVE ASSESSMENT INDEX | INTER-ANNUAL ASSESSMENT INDEX |
|---|---|---|---|---|---|
| 01 | AAA CITY | SAFETY/SECURITY | 1.12 | 1.78 | 1.13 |
| | | MEDICAL CARE/HEALTH | ... | ... | ... |
| | | ... | ... | ... | ... |
| 02 | BBB CITY | SAFETY/SECURITY | ... | ... | ... |
| | | MEDICAL CARE/HEALTH | ... | ... | ... |
| | | ... | ... | ... | ... |
| ... | ... | ... | ... | ... | ... |

FIG.8

| LOCAL GOVERNMENT BODY ID | LOCAL GOVERNMENT BODY NAME | SUCCESS CASES | FAILURE CASES | BUDGET ALLOCATION | POLICY CONTENT | ORGANIZATIONAL FRAMEWORK | ... |
|---|---|---|---|---|---|---|---|
| 01 | AAA CITY | ... | ... | ... | ... | ... | ... |
| ... | ... | ... | ... | ... | ... | ... | ... |

| | VALUATION ASPECT | VALUATION CATEGORY | ASSESSMENT TARGET |
|---|---|---|---|
| V VALUATION OF CITY | $V_1$ ENVIRONMENTAL VALUATION (EQ) | $V_{1-1}$ ATMOSPHERE | NOX, SOX, PHOTOCHEMICAL OXIDANTS, SPM, CO, ETC. |
| | | $V_{1-2}$ WATER | HYDROGEN ION CONCENTRATION (pH), BIOCHEMICAL OXYGEN DEMAND (BOD), SUSPENDED SOLIDS (SS), DISSOLVED OXYGEN (DO), COLIFORM COUNT, ETC. |
| | | $V_{1-3}$ LAND | PROPORTION OF GREEN FIELDS, PROPORTION OF BROWN FIELDS, FOREST AREA RATIO, ABANDONED ARABLE LAND, ETC. |
| | | $V_{1-4}$ CRITERIA OTHER THAN ATMOSPHERE/WATER/LAND | NUMBER OF COMPLAINTS/ACCIDENTS, ETC. |
| | $V_2$ SOCIETAL VALUATION (SC) | $V_{2-1}$ HOUSING | COMFORTABLE LIVING SPACE, INDIVIDUAL LIVING SPACE, ETC. |
| | | $V_{2-2}$ FOOD OR ENERGY | FOODSTUFF/ENERGY/NUMBER AND HOURS OF SHOPS SELLING DAILY USE ITEMS, ETC. |
| | | $V_{2-3}$ TRAFFIC/TRANSPORT | ACCESS TO PUBLIC TRANSPORT, CONGESTION DISTANCE, TRAVEL TIME, ETC. |
| | | $V_{2-4}$ SAFETY/SECURITY | NUMBER OF OCCURRENCES OF CRIMES/FIRES/TRAFFIC ACCIDENTS, ETC. |
| | | $V_{2-5}$ DISASTER PREVENTION | QUALITY OF DISASTER PREVENTION FUNCTIONS IN TARGET AREA |
| | | $V_{2-6}$ EDUCATION | NUMBER OF PUPILS PER ELEMENTARY, MIDDLE, AND HIGH SCHOOL TEACHER, NUMBER OF TEACHING STAFF, ETC. |
| | | $V_{2-7}$ MEDICAL CARE/HEALTH | NUMBER OF PATIENTS, NUMBER OF SICKBEDS, COST OF MEDICAL CARE, AVERAGE LIFESPAN, RATE OF METABOLIC SYNDROME, TIME REQUIRED FOR DIAGNOSIS, ETC. |
| | | $V_{2-8}$ GOVERNMENT | NUMBER OF WORKERS PER RESIDENT, TIME FROM FILING OF APPLICATION PAPERS UNTIL ACCEPTANCE, ETC. |
| | | $V_{2-9}$ COMMUNITY | USE OF PUBLIC FACILITIES SUCH AS COMMUNITY HALLS, OPPORTUNITIES TO PARTICIPATE IN SOCIETY, ETC. |
| | | $V_{2-10}$ LOCAL ACTIVITY | NATURAL GROWTH OF POPULATION, SOCIETAL GROWTH OF POPULATION |
| | $V_3$ FISCAL VALUATION (ECON) | $V_{3-1}$ FISCAL FOUNDATION OF GOVERNMENT | LOCAL TAX REVENUE, BOND RATES, BUDGET/REVENUE AND EXPENDITURE, ETC. |
| | | $V_{3-2}$ INDIVIDUAL ECONOMIC POWER | PER CAPITA TAXABLE INCOME, ETC. |
| | | $V_{3-3}$ EMPLOYMENT | EMPLOYMENT RATE, ETC. |

FIG.15

| IMPACT ASPECT | IMPACT CATEGORY | ASSESSMENT TARGET |
|---|---|---|
| $B_1$ CRITERIA RELATED TO CLIMATE CHANGE (EFFECT ON CLIMATE CHANGE) | $B_{1-1}$ AMOUNT OF GREENHOUSE GAS (GHG) EMISSIONS CAUSED BY INDUSTRY, CONSUMER, TRANSPORT, AND ENERGY CONVERSION SECTORS | EMISSIONS (TON-$CO_2$), EMISSIONS (TON-$CO_2$) PER POPULATION (PERSON), ETC. |
| | $B_{1-2}$ INFLUENCE OF LIFECYCLE | EFFECT OF TARGET AREA ACTIVITY ON CLIMATE CHANGE (LCA ASSESSMENT), ETC. |
| $B_2$ RESOURCE RECYCLING RELATED CRITERIA (EFFECT ON RESOURCE DEPLETION) | $B_{2-1}$ FINAL DISPOSAL AMOUNT | FINAL DISPOSAL AMOUNT (kg), PER CAPITA FINAL DISPOSAL AMOUNT (kg PER PERSON, DAY), ETC. |
| | $B_{2-2}$ RECYCLING | AMOUNT RECYCLED (kg), PER CAPITA RECYCLING AMOUNT (kg PER PERSON), RECYCLING RATE, ETC. |
| | $B_{2-3}$ USE OF RESOURCES | TYPES OF USED RESOURCES, AMOUNT OF RESOURCE USED (kg), PER CAPITA RESOURCE USAGE (kg PER PERSON), ETC. |
| $B_3$ BIODIVERSITY RELATED CRITERIA (EFFECT ON BIODIVERSITY) | $B_{3-1}$ EFFECT ON HUMAN BODY | CONVERTED TOXICITY OF TOXIC CHEMICALS EMITTED INTO THE ATMOSPHERE IN THE TARGET REGION, ETC. |
| | $B_{3-2}$ EFFECT ON ECOSYSTEM | NUMBERS AND DISTRIBUTIONS OF SPECIES, EASE OF BREATHING FOR LIVING ORGANISMS, SIZE AND QUALITY OF ECOSYSTEM, INFLUENCE OF TARGET REGION ACTIVITY ON ECOSYSTEM INSIDE AND OUTSIDE OF TARGET REGION, CONVERTED TOXICITY OF TOXIC CHEMICALS EMITTED INTO THE ATMOSPHERE IN THE TARGET REGION, ETC. |

B ENVIRONMENTAL IMPACT

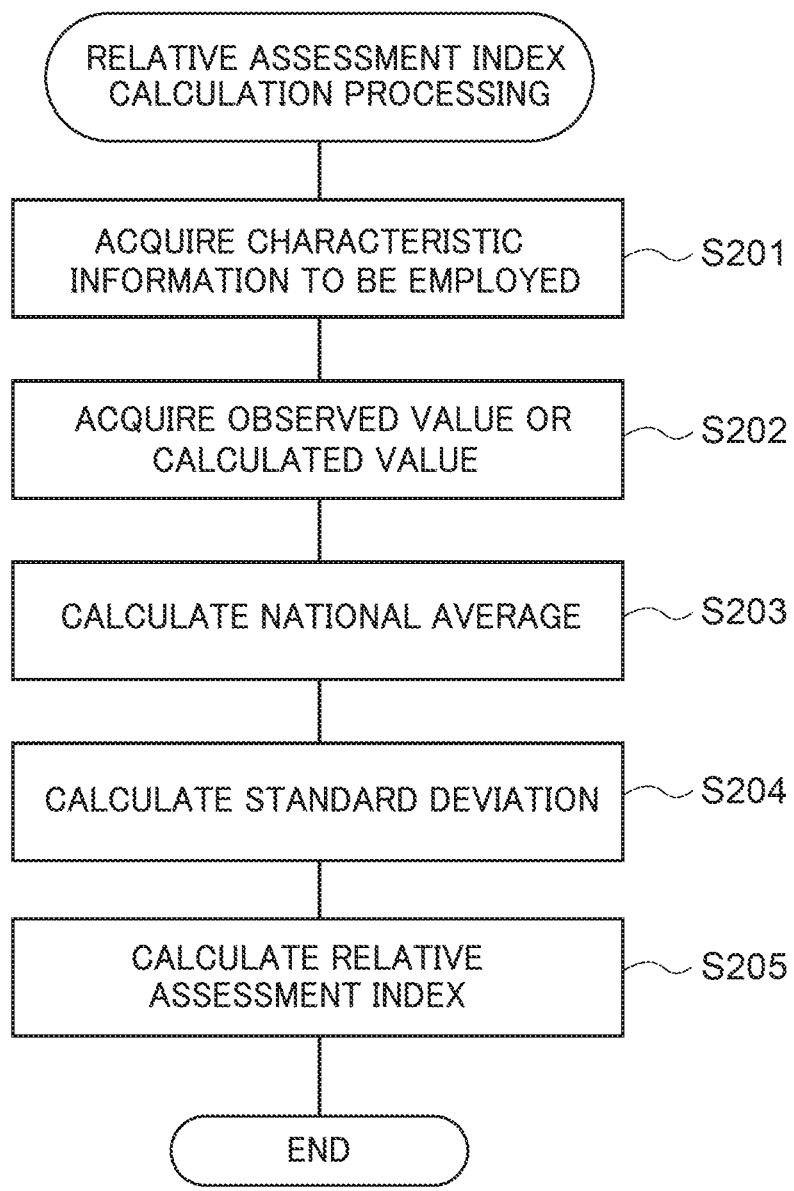

ASSESSING AND SELECTING DECISION MAKING ENTITIES FOR ACQUIRING AND PRESENTING INFORMATION

CROSS-REFERENCE TO RELATED APPLICATION

This application is a continuation application of International Application No. PCT/JP/2014/078962, filed Oct. 30, 2014, the disclosure of which is incorporated herein by reference in its entirely.

FIELD

The embodiments discussed herein are related to an information presentation method, an information presentation device, and a recording medium storing an information presentation program.

BACKGROUND

When a decision making entity such as a local government body is making a decision on governing policy or the like, information related to decision making by another decision making entity, may, in some cases, serve as material for consideration in the decision. In such an event, it is conceivable that the decision making entity that should be referenced is selected by assessing plural decision making entities.

For example, in relation to assessing a decision making entity, a system for assessing local government bodies has been proposed in which a single local government body conducts a multiple-item survey of residents in order to perform a self-assessment of management.

Known indexes include "CASBEE (registered trademark) for Cities", which is a comprehensive environmental performance assessment tool for cities, and the "Human Development Index (HDI)", which is an index indicating the quality of life of the people and the rate of development of a country. In CASBEE (registered trademark) for Cities, respective cities are assessed using deviation values estimated by comparison against data from other cities. In the Human Development Index, a normalization method known as the goal post method is employed. The goal post method is a method in which a maximum value and a minimum value (the goal posts) are set for assessment criteria, and normalization is performed based on the maximum value and the minimum value such that the respective assessment criteria have values ranging from 0 to 1.

RELATED PATENT DOCUMENTS

Japanese Laid-Open Patent Publication No. 2005-332350

SUMMARY

According to an aspect of the embodiments, an information presentation method includes: for respective decision making entities, calculating assessment indexes of plural respective assessment criteria, based on characteristic information representing a characteristic of each of the decision making entities; by a processor, selecting, from the plural decision making entities, at least one decision making entity having a characteristic similar to that of an information presentation target decision making entity that is a target of information presentation, based on an assessment index calculated for each of the decision making entities; and acquiring and presenting information related to decision making by the selected decision making entity, from a storage section storing information related to decision making for each of the plural decision making entities.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a characteristic information table;

FIG. 3 is a diagram illustrating an example of a target value table;

FIG. 4 is a diagram illustrating an example of an employed characteristic information table;

FIG. 5 is a diagram illustrating an example of calculation results for assessment indexes;

FIG. 8 is a diagram illustrating an example of a presentation information table;

FIG. 14 is a chart illustrating assessment criteria according to the first exemplary embodiment;

FIG. 15 is a chart illustrating assessment criteria according to the first exemplary embodiment;

FIG. 18 is a flowchart illustrating relative assessment index calculation processing.

DESCRIPTION OF EMBODIMENTS

Detailed explanation follows regarding exemplary embodiments according to technology disclosed herein, with reference to the drawings. Explanation is given for each of the following exemplary embodiments using an example of a case in which information is presented to a local government body, which is an example of a decision making entity that makes decisions such as policy proposals or strategic decisions.

First Exemplary Embodiment

Figure 1:
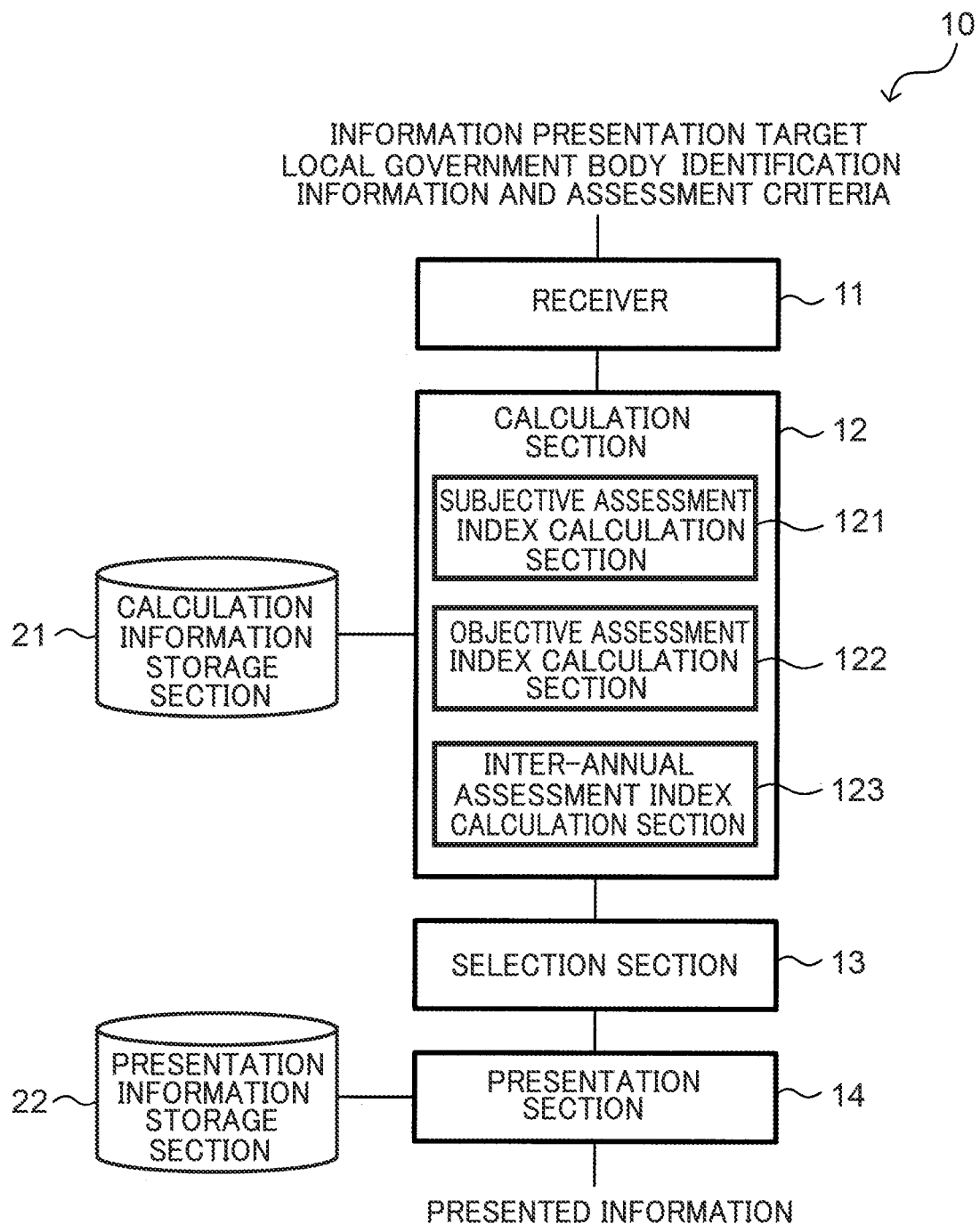
FIG. 1 is a functional block diagram illustrating a schematic configuration of an information presentation device according to a first exemplary embodiment.

As illustrated in FIG. 1, an information presentation device 10 according to a first exemplary embodiment includes a receiver 11, a calculation section 12, a selection section 13, and a presentation section 14.

The receiver 11 receives identification information indicating an information presentation target local government body targeted for the information presentation inputted through an input device (not illustrated in the drawings) such as a keyboard or mouse connected to the information presentation device 10, by a user such as a staff member of the information presentation target local government body. The receiver 11 also receives assessment criteria inputted through the input device by the user. The assessment criteria predetermine the criteria needed for assessment of a local government body, such as nature, social involvement, safety/security, education, medical care/health, social dynamism, lifestyle, fiscal foundation, fiscal situation, labor/employment, and final disposal amount. Assessment criteria are selected and input by a user according to what kind of decision the information presentation target local government body is trying to make. Note that all of the assessment criteria may be selected.

The calculation section 12 cross-references various tables stored in a calculation information storage section 21, and calculates assessment indexes of the assessment criteria received by the receiver 11, for each local government body.

A characteristic information table 31 registered with characteristic information for each local government body is stored in the calculation information storage section 21. Characteristic information is information indicating the characteristics of a local government body. For example, information indicating characteristics such as whether a local government body is a local government body in an urban area, or a local government body in a sparsely populated region. More specifically, in addition to basic information such as the size, demographic (generational) composition, and industrial structure of a local government body, supplementary information focusing on the constituent economy, society, and environment of a local government body may also be characteristic information. An example of a characteristic information table 31 is illustrated in FIG. 2. In the example of FIG. 2, characteristic information categories and observed values for those categories are associated with local government body IDs and local government body names that are identification information for local government bodies. The observed values are actual values of the characteristic information. Annual values are registered for the observed values.

A target value table 32 registered with target values and minimum standards for each local government body and for each assessment criterion is also stored in the calculation information storage section 21. The target values and the minimum standards are values set for each local government body according to the characteristics of that local government body. The minimum standard is a standard that must be met for the respective assessment criterion. An example of a target value table 32 is illustrated in FIG. 3. In the example of FIG. 3, a target value and a minimum standard are associated with a local government body ID and local government body name for each assessment criterion. In the example of FIG. 3, "–" is displayed in the minimum standard column for assessment criteria having no stipulated minimum standard.

An employed characteristic information table 33 registered with characteristic information employed for calculating assessment indexes for each assessment criterion is also stored in the calculation information storage section 21. An example of an employed characteristic information table 33 is illustrated in FIG. 4. The example of FIG. 4 indicates that, for example, the assessment criterion "safety/security" employs the "number of recognized criminal offenses" and "population" characteristic information registered in the characteristic information table 31 illustrated in FIG. 2 for the calculation of the assessment indexes.

As illustrated in FIG. 1, the calculation section 12 includes a subjective assessment index calculation section 121, an objective assessment index calculation section 122, and an inter-annual assessment index calculation section 123. The subjective assessment index calculation section 121 calculates a subjective assessment index (described in detail below) for each assessment criterion received by the receiver 11. The objective assessment index calculation section 122 calculates an objective assessment index (described in detail below) for each assessment criterion. The inter-annual assessment index calculation section 123 calculates an inter-annual assessment index (described in detail below) for each assessment criterion. Namely, a subjective assessment index, an objective assessment index, and an inter-annual assessment index are respectively calculated for each assessment criterion. Detailed description follows for the subjective assessment index calculation section 121, the objective assessment index calculation section 122, and the inter-annual assessment index calculation section 123, respectively.

The subjective assessment index calculation section 121 calculates, for each assessment criterion, a subjective assessment index that is a subjective assessment index for assessing target attainment for each local government body. The subjective assessment index may, for example, be defined as in Equation (1) below.

$$\text{subjective assessment index} = (\text{observed value} - \text{minimum standard})/(\text{target value} - \text{minimum standard}) \quad (1)$$

More specifically, the subjective assessment index calculation section 121 acquires, from the employed characteristic information table 33, characteristic information to be employed for calculating assessment indexes for each assessment criterion received by the receiver 11. The subjective assessment index calculation section 121 then acquires observed values of the characteristic information to be employed from the characteristic information table 31. The subjective assessment index calculation section 121 also acquires a target value and a minimum standard for each assessment criterion from the target value table 32. The subjective assessment index calculation section 121 then uses the acquired observed values, target values, and minimum standards to calculate subjective assessment indexes for each local government body and for each assessment criterion according to Equation (1).

The objective assessment index calculation section 122 calculates, for each assessment criterion, an objective assessment index that is an objective assessment index for assessing relative superiority. The objective assessment index may, for example, be defined as in Equation (2) below.

$$\text{objective assessment index} = \text{observed value of calculation target local government body}/\text{local government body average value} \quad (2)$$

More specifically, the objective assessment index calculation section 122 acquires, from the employed characteristic information table 33, characteristic information to be employed for calculating the assessment indexes for each assessment criterion received by the receiver 11. Characteristic information to be employed that was acquired by the subjective assessment index calculation section 121 may be re-used. The objective assessment index calculation section 122 then acquires observed values of the characteristic information to be employed from the characteristic information table 31 for at least a portion of the local government bodies from out of all of the local government bodies. At least a portion of the local government bodies may refer to, from out of all of the local government bodies, a group of local government bodies including local government bodies other than the information presentation target local government body. For example, the group of local government bodies may be a collection of local government bodies having specific characteristic information that is similar to that of the information presentation target local government body. More specifically, a collection of local government bodies having similar industrial structure and demographic composition to the information presentation target local government body may be set as the local government body group. The characteristic information may be determined to be similar when the difference in observed values of characteristic information between local government bodies is within a specific range.

The objective assessment index calculation section 122 then calculates an average observed value for the at least portion of the local government bodies, and sets the "local government body average value" of Equation (2). The "local government body average value" is calculated for each assessment criterion. Although explanation is given regarding a case in which the local government body average is calculated from observed values of local government bodies having specific characteristic information that is similar in the present exemplary embodiment, the observed values of all of the local government bodies may be employed to calculate a national average. Moreover, although the average value is employed in the present exemplary embodiment, instead of the average value, other statistically obtained values such as a mode value, a maximum value, or a minimum value of the observed values of the other local government bodies may be employed as a standard value of the objective assessment indexes, as long as the value allows assessment of relative superiority.

The objective assessment index calculation section 122 also acquires, for the calculation target local government body of the objective assessment index, observed values of the characteristic information to be employed from the characteristic information table 31. The objective assessment index calculation section 122 then uses the acquired observed values and the calculated local government body average value to calculate objective assessment indexes for each local government body and for each assessment criterion according to Equation (2).

The inter-annual assessment index calculation section 123 calculates an inter-annual assessment index for assessing whether or not a respective assessment criterion is improving annually. Although an index assessing changes to assessment criterion over yearly units is employed in the present exemplary embodiment, an index assessing changes to assessment criterion over a freely selected period of time, such as every half year, every three months, or every month, may be employed. The inter-annual assessment index may, for example, be defined as in Equation (3) below.

$$\text{inter-annual assessment index} = \text{observed value (year } t)/\text{observed value (year } t-1) \quad (3)$$

More specifically, the inter-annual assessment index calculation section 123 acquires, from the employed characteristic information table 33, characteristic information to be employed for calculating assessment indexes for each assessment criterion received by the receiver 11. Characteristic information to be employed that was acquired by the subjective assessment index calculation section 121 may be re-used. The inter-annual assessment index calculation section 123 then acquires observed values of characteristic information to be employed for year t and year t−1 from the characteristic information table 31. The inter-annual assessment index calculation section 123 then uses the acquired observed values for year t and for year t−1 to calculate inter-annual assessment indexes for each local government body and for each assessment criterion according to Equation (3).

Figure 6:
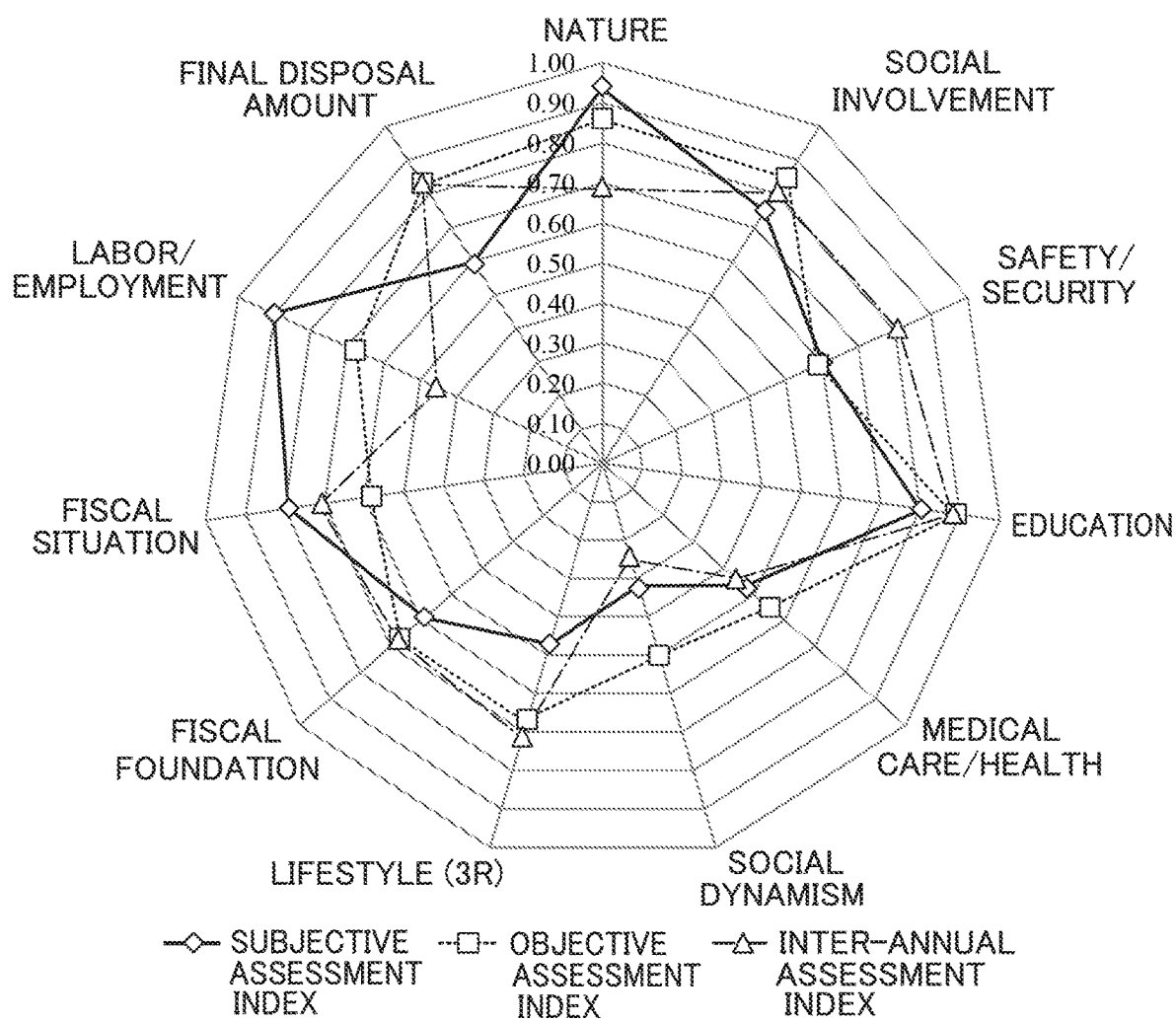
FIG. 6 is a graph illustrating an example of calculation results for assessment indexes.

FIG. 5 illustrates calculation results of assessment indexes by the calculation section 12. As illustrated in FIG. 5, the objective assessment index, the subjective assessment index, and the inter-annual assessment index are respectively calculated for each assessment criterion, for each local government body. FIG. 6 illustrates an example of the calculation results of the assessment indexes graphed.

The selection section 13 selects at least one local government body having characteristics similar to those of the information presentation target local government body from out of all of the local government bodies, based on the respective assessment indexes of the local government bodies calculated by the calculation section 12. For example, the selection section 13 generates vectors having values of the assessment indexes of respective assessment criteria as elements, for each local government body. The selection section 13 then selects local government bodies for which the degree of similarity (for example, a degree of cosine similarity) between the vector of the information presentation target local government body and the vector of another local government body is at a predetermined specific value or greater. Moreover, a specific number of local government bodies may be selected in sequence starting from that with the highest degree of similarity.

Moreover, as another selection method for local government bodies having characteristics similar to those of the information presentation target local government body, similar local government bodies may be grouped using clustering analysis, based on the assessment indexes of each local government body. More specifically, the selection section 13 may employ a method of categorizing into hierarchical clusters. For example, the assessment indexes of each local government body may be used to calculate a Euclid distance $d_{ij}$ between the local government body i and the local government body j indicated in Equation (4) below, and local government bodies having a Euclid distance $d_{ij}$ of a predetermined specific value or less may be grouped.

$$d_{ij} = \sqrt{\Sigma_{k=1}^{n}(x_{ik}-x_{jk})^2} \quad (4)$$

Herein, $x_{ik}$ is a value of an assessment index of an assessment criterion k for the local government body i, and n is the total number of assessment criteria.

Moreover, the selection section 13 may employ a method of categorizing into non-hierarchical clusters. In categorization into non-hierarchical clusters, a number of groups to be categorized is set, and local government bodies are initially randomly categorized such that there is that number of groups. Next, the centroid of each group is estimated based on assessment indexes of the local government bodies included in the randomly categorized groups. Then re-categorization is performed based on the distances between the assessment indexes of each local government body and the centroids. Categorization is performed such that local government bodies having similar assessment indexes are in the same group by repeating this operation.

Figure 7:
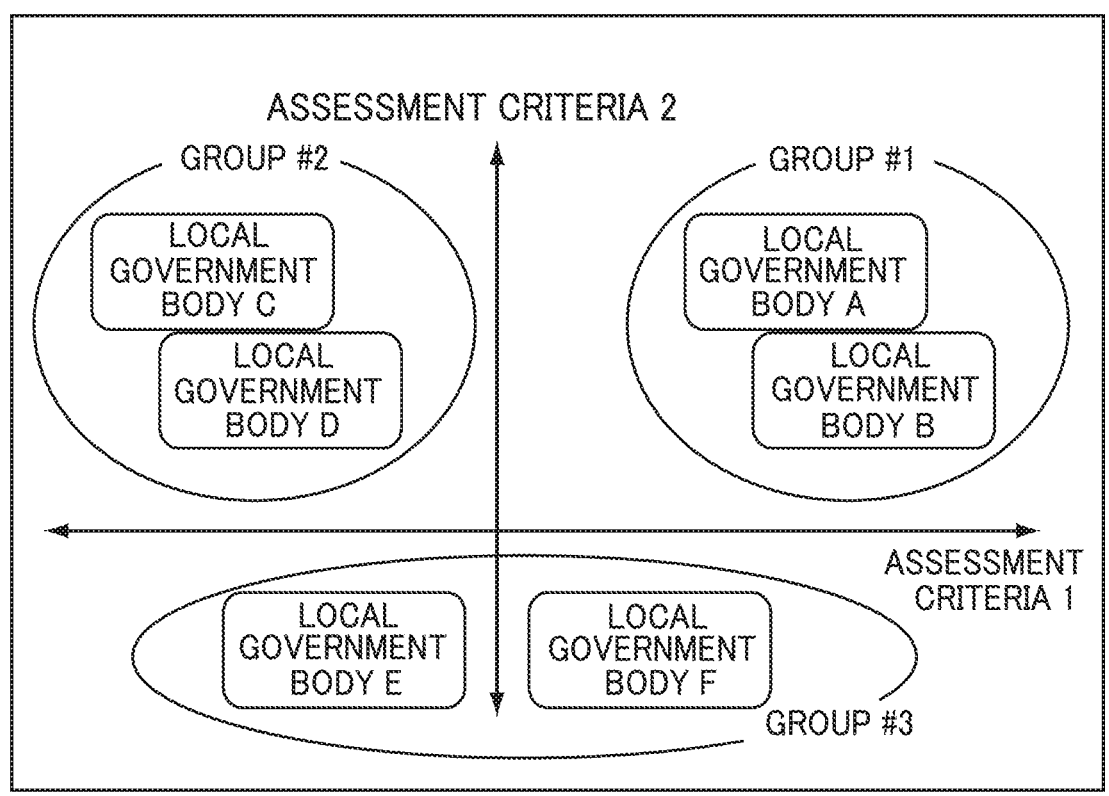
FIG. 7 is a diagram for explaining local government body selection.

The selection section 13 groups each local government body as described above, and selects another local government body included in the group that includes the information presentation target local government body. For example, as illustrated in FIG. 7, each local government body is grouped, and when the information presentation target local government body is local government body A, the other local government body included in group #1 is selected (local government body B in the example of FIG. 7). Note that the example of FIG. 7 illustrates a case in which each local government body is categorized in space representing two assessment criteria, for simplicity of explanation. The space for categorizing the local government bodies is space having a number of dimensions that depends on the number of assessment criteria.

As another selection method for local government bodies having characteristics similar to those of the information presentation target local government body, a self-organizing map may be employed. A self-organizing map is a type of neural network, and is a model representing distance on a map of degrees of similarity in obtained input information. The self-organizing map may, for example, detect trends and correlation present in high order data, and is useful for allowing humans to visually understand the high order data. A feature of self-organizing maps is that they can cluster various types of high order data.

More specifically, the selection section 13 denotes a time (a number of repetitions) as t, a weight of a unit (group) j as $m_j$, an input sample (a vector having assessment indexes of the information presentation target local government body as elements) as x, and weight values of from 0 to 1 as $\alpha$ and h. Moreover, a unit most similar to sample x is denoted c. The selection section 13 then selects the unit most similar to sample x (Equation (5) below). Next, the selection section 13 makes repeated calculations such that similar units gather over time and dissimilar units move apart (Equation (6) below). Moreover, the selection section 13 sets the weights to decrease over time (Equation (7) below). Then, after a specific time has elapsed in the self-organizing mapping, the selection section 13 selects a local government body represented by a sample assigned to the same unit as the sample x that represents the information presentation target local government body.

$$\|x(t) - m_c(t)\| = \min_j \|x(t) - m_j(t)\| \quad (5)$$

$$m_j(t+1) = m_j(t) + \alpha(t) \times h_{cj}(t) \times (x(t) - m_j(t)) \quad (6)$$

$$\alpha(t) = \text{Max}\left(1 - \frac{t}{T}, 0\right) \quad h_{cj}(t) = \exp\left(-\frac{\|r_c - r_j\|^2}{2\sigma^2(t)}\right) \quad (7)$$

The presentation section 14 cross-references the presentation information table 34 stored in the presentation information storage section 22, and acquires each type of presentation information from when the local government body selected by the selection section 13 has made decisions in the past. From the viewpoint of the basic information, environments, economies, and societies of the local government bodies, it is conceivable that the local government bodies having similar characteristics are highly likely to face problems similar to those of the information presentation target local government body. Information related to decision making by the local government body selected by the selection section 13 is therefore useful information to the information presentation target local government body. An example of a presentation information table 34 is illustrated in FIG. 8. In the example of FIG. 8, success cases and failure cases when making decisions, budget allocations for decision making items, the content of policies introduced by decision making, organizational frameworks in place when decisions were made, and so on, are registered as presentation information associated with local government body IDs and local government body names. Note that the presentation information is not limited to the above; various information that could be referenced when making decisions, such as the results of policies introduced by decision making, the predicted effects of decision making, problems, and the persons responsible for policies introduced by decision making and their contact details, may also be registered.

Moreover, the presentation information may be categorized according to the topic of the decision making and registered in the presentation information table 34. The topic may be, for example, local revitalization, agriculture, crime prevention, disaster prevention, or environmental conservation. More specifically, explanation is given regarding a case in which information, to be referenced by the information presentation target local government body when making a decision related to addressing damage caused by wildlife, is presented. In this case, a case on the topic of agriculture, for example, the budget size for work on a fence for preventing intrusion by harmful wildlife, the number of wildlife damage events, or the like, may be stored associated with the topic "agriculture" in the presentation information table 34. Then, when a user selects the topic "agriculture" through the input device, the presentation section 14 acquires a case associated with the input topic "agriculture" that is a case of the local government body selected by the selection section 13. The user can thereby reference how the number of wildlife damage events varies with respect to budget size, and the information can be presented for referencing when deciding whether or not a fence for preventing intrusion by harmful wildlife is to be introduced into the local government body of the user, to what extent it should be introduced, etc. By categorizing the presentation information into topics and registering the categorizations in the presentation information table 34, the search target is narrowed when acquiring presentation information.

The presentation section 14 presents the acquired presentation information to the user by, for example, displaying the presentation information on a display device (not illustrated in the drawings), or outputting the presentation information from a printer (not illustrated in the drawings), connected to the information presentation device 10.

Figure 9:
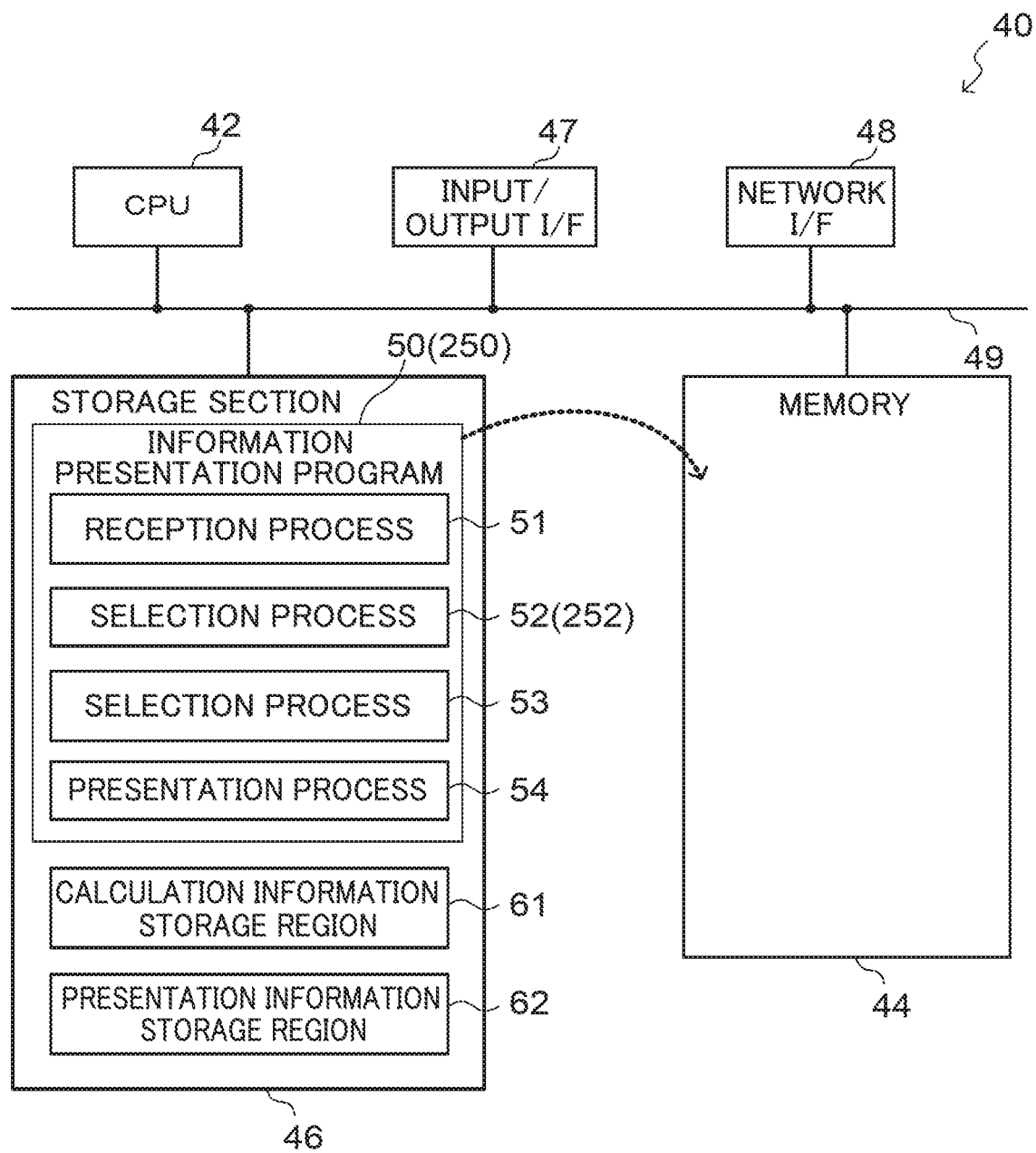
FIG. 9 is a block diagram illustrating a schematic configuration of a computer that functions as an information presentation device according to the first exemplary embodiment and a second exemplary embodiment.

The information presentation device 10 may be implemented by, for example, a computer 40 illustrated in FIG. 9. The computer 40 includes a CPU 42, a memory 44, a non-volatile storage section 46, an input/output interface (I/F) 47, and a network I/F 48. The CPU 42, the memory 44, the storage section 46, the input/output I/F 47, and the network I/F 48 are connected together through a bus 49.

The storage section 46 may be implemented by a hard disk drive (HDD), flash memory, or the like. An information presentation program 50 for causing the computer 40 to function as the information presentation device 10 is stored in the storage section 46 that serves as a storage medium. Moreover, the storage section 46 includes a calculation information storage region 61 and a presentation information storage region 62. The CPU 42 reads the information presentation program 50 from the storage section 46, expands the information presentation program 50 into the memory 44, and sequentially executes processes included in the information presentation program 50.

The information presentation program 50 includes a reception process 51, a calculation process 52, a selection process 53, and a presentation process 54. The CPU 42 operates as the receiver 11 illustrated in FIG. 1 by executing the reception process 51. The CPU 42 also operates as the calculation section 12 illustrated in FIG. 1 by executing the calculation process 52. The CPU 42 also operates as the selection section 13 illustrated in FIG. 1 by executing the selection process 53. The CPU 42 also operates as the presentation section 14 illustrated in FIG. 1 by executing the presentation process 54.

The calculation information storage region 61 is employed as the calculation information storage section 21 illustrated in FIG. 1 when the information presentation device 10 is implemented by the computer 40. Moreover, the presentation information storage region 62 is employed as the presentation information storage section 22 illustrated in FIG. 1. The computer 40 that executes the information presentation program 50 thereby functions as the information presentation device 10.

Note that the information presentation device 10 may be implemented by, for example, a semiconductor integrated circuit, more specifically, by an application specific integrated circuit (ASIC) or the like.

Next, explanation follows regarding operation of the information presentation device 10 according to the first exemplary embodiment. When identification information for the information presentation target local government body and assessment criteria are input by a user through an input device such as a keyboard or mouse (not illustrated in the drawings) connected to the information presentation device 10, the information presentation processing illustrated in FIG. 10 is executed in the information presentation device 10.

Figure 10:
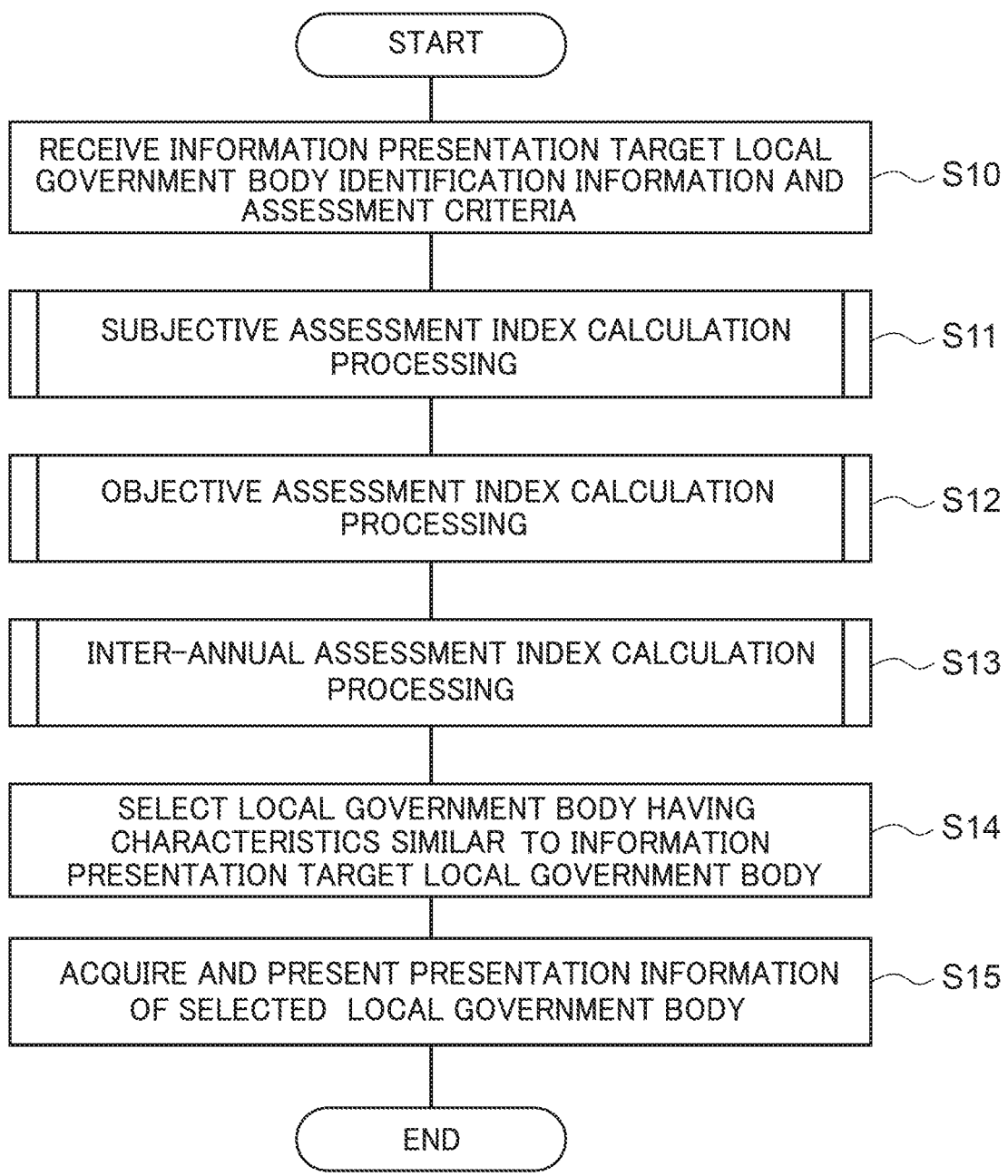
FIG. 10 is a flowchart illustrating information presentation processing according to the first exemplary embodiment.

At step S10 of the information presentation processing illustrated in FIG. 10, the receiver 11 receives the identification information for the information presentation target local government body and the assessment criteria that were input. Here, one received assessment criterion includes "safety/security".

Note that the "observed values" indicated in the process below are not necessarily limited to observed values themselves. Secondary calculation values may be calculated from the observed values and employed therefor.

Figure 11:
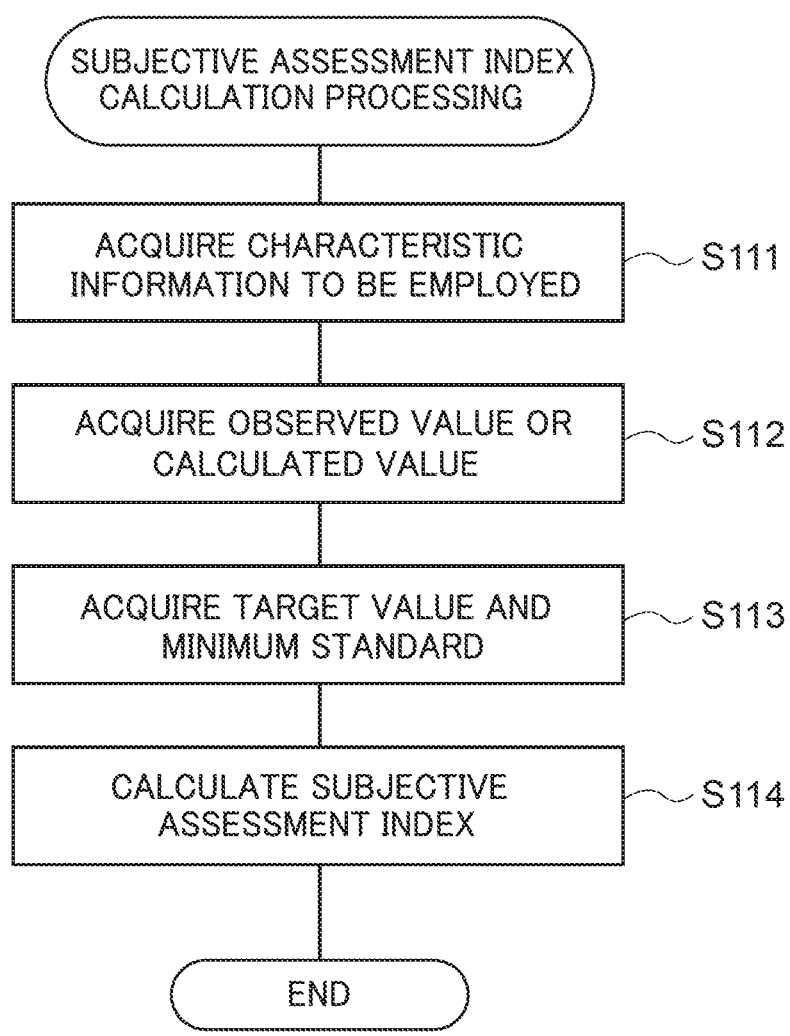
FIG. 11 is a flowchart illustrating subjective assessment index calculation processing.

Next, at step S11, the subjective assessment index calculation processing illustrated in FIG. 11 is executed. At step S111 of the subjective assessment index calculation processing illustrated in FIG. 11, the subjective assessment index calculation section 121 acquires, from the employed characteristic information table 33, characteristic information to be employed for calculating the assessment indexes for each assessment criterion received by the receiver 11 at step S10. For example, "number of recognized criminal offenses" and "population" are acquired from the employed characteristic information table 33 illustrated in FIG. 4 as characteristic information to be employed to calculate the assessment indexes for the "safety/security" assessment criterion.

Next, at step S112, the subjective assessment index calculation section 121 acquires observed values of characteristic information to be employed from the characteristic information table 31. For example, an observed value of the characteristic information "number of recognized criminal offenses" for a given year (for example, 2013) of "11,536 cases" is acquired from the characteristic information table 31 illustrated in FIG. 2 for a local government body AAA City. Observed values of characteristic information to be employed for the given year are similarly acquired for other assessment criteria.

Next, at step S113, the subjective assessment index calculation section 121 acquires target values and minimum standards for each assessment criterion from the target value table 32. For example, a target value of "12,900 cases" is acquired from the target value table 32 illustrated in FIG. 3 for the local government body AAA City. Moreover, "0 cases" is set as the minimum standard since no minimum standard is registered in the target value table 32. Target values and minimum standards are similarly acquired for other assessment criteria.

Next, at step S114, the subjective assessment index calculation section 121 uses the acquired observed value of "11,536 cases", the target value of "12,900 cases", and the minimum standard of "0 cases" to calculate a subjective assessment index as in, for example, the equation below.

$$\text{subjective assessment index} = (\text{target value} - \text{minimum standard})/(\text{observed value} - \text{minimum standard}) = (12{,}900 - 0)/(11{,}536 - 0) = 1.12$$

Note that since the assessment indicating the assessment index of the assessment criterion "safety/security" that employs the "number of recognized criminal offenses" decreases as the observed value increases, the reciprocal of Equation (1) above is employed here. The same applies for the objective assessment index and the inter-annual assessment index of the assessment criterion "safety/security" that employ the "number of recognized criminal offenses" below. Subjective assessment indexes are similarly calculated for other assessment criteria.

Subjective assessment indexes are calculated for each local government body and for each assessment criterion by performing the above processing for each local government body. When calculation of the subjective assessment indexes for each assessment criterion is finished for all of the local government bodies, processing returns to the information presentation processing illustrated in FIG. 10.

Figure 12:
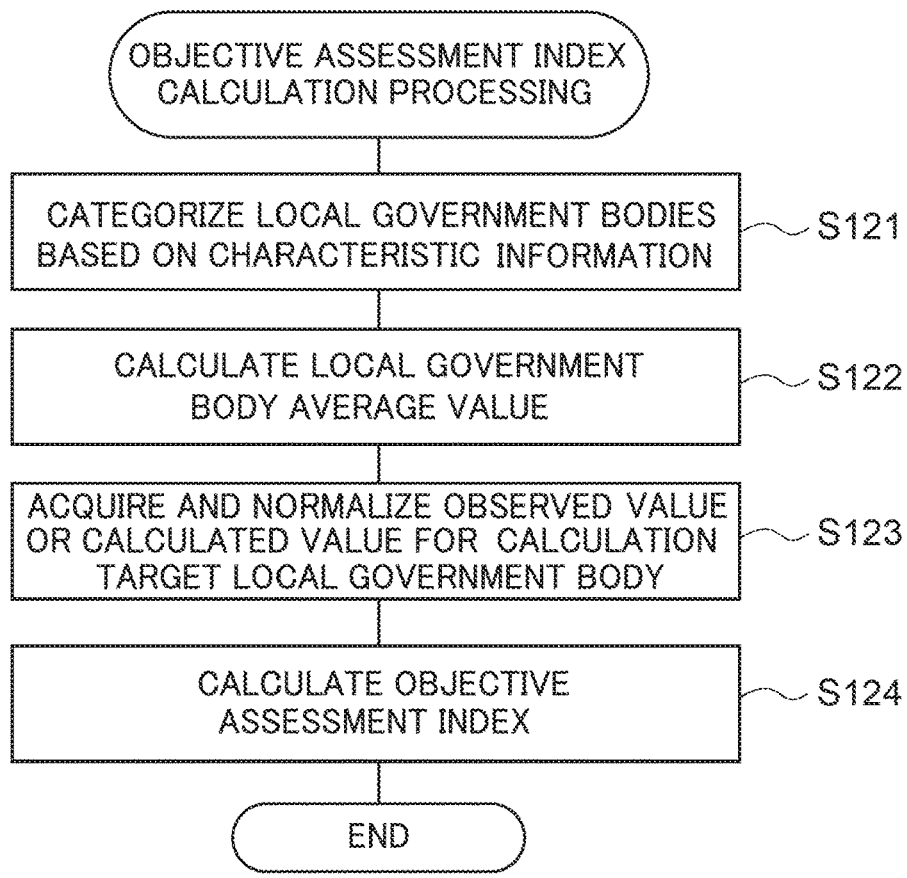
FIG. 12 is a flowchart illustrating objective assessment index calculation processing.

Next, at step S12 of the information presentation processing illustrated in FIG. 10, the objective assessment index calculation processing illustrated in FIG. 12 is executed. At step S121 of objective assessment index calculation processing illustrated in FIG. 12, the objective assessment index calculation section 122 categorizes all of the local government bodies registered in the characteristic information table 31 into local government body groups having similar observed values for the given year for specific characteristic information (for example, industrial structure and demographic composition).

Next, at step S122, the objective assessment index calculation section 122 extracts, from out of the plural local government bodies categorized at step S121 above, local government bodies included in the local government body group that includes the information presentation target local government body. The objective assessment index calculation section 122 then acquires an observed value for the characteristic information to be employed for the given year (for example, 2013), acquired at step S111 above, for each extracted local government body. Since the objective assessment index is an index for assessing relative superiority, the observed values are normalized such that, for example, "number of recognized criminal offenses per 10,000 inhabitants" is employed for "number of recognized criminal offenses". The objective assessment index calculation section 122 then calculates the average value of the normalized observed values of the extracted local government bodies, and sets the "local government body average value". For example, the local government body average value of the "number of recognized criminal offenses per 10,000 inhabitants" is calculated to be "142.21". The local government body average values are similarly calculated for other assessment criteria.

Next, at step S123, the objective assessment index calculation section 122 acquires, for the calculation target local government body of the objective assessment index, observed values of the characteristic information to employed from the characteristic information table 31, and normalizes the observed values. For example, an observed value of the characteristic information "number of recognized criminal offenses" for the given year (for example, 2013) of "11,536 cases" is acquired from the characteristic information table 31 illustrated in FIG. 2, for local government body AAA City. An observed value of the characteristic information "population" for the given year (for example, 2013) of "1,440,124 people" is also acquired. Observed values of characteristic information to be employed for the given year are similarly acquired for other assessment criteria. The observed values are then normalized, and a number of recognized criminal offenses per 10,000 inhabitants of "80.10 cases" is calculated as the observed value of the calculation target local government body. The processing of the current step is performed with each local government body registered in the characteristic information table 31 sequentially set as the calculation target local government body.

Next, at step S124, the objective assessment index calculation section 122 uses the calculated local government body average value of "142.21" and the observed value of the calculation target local government body of "80.10" to calculate an objective assessment index as in, for example, the equation below.

objective assessment index=local government body average value/observed value of calculation target local government body=142.21/80.10=1.78

The processing of the current step is performed with each local government body registered in the characteristic information table 31 sequentially set as the calculation target local government body, such that objective assessment indexes are calculated for each local government body and for each assessment criterion. When calculation of the objective assessment indexes has finished for all of the local government bodies and for each assessment criterion, processing returns to the information presentation processing illustrated in FIG. 10.

Figure 13:
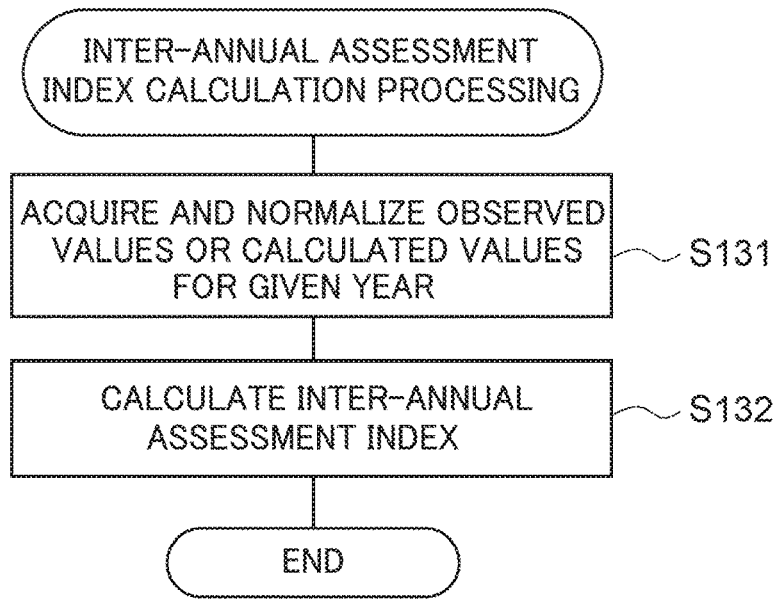
FIG. 13 is a flowchart illustrating inter-annual assessment index calculation processing.

Next, at step S13 of the information presentation processing illustrated in FIG. 10, the inter-annual assessment index calculation processing illustrated in FIG. 13 is executed. At step S131 of the inter-annual assessment index calculation processing illustrated in FIG. 13, the inter-annual assessment index calculation section 123 acquires the observed values of the characteristic information to be employed for the given year that were acquired at step S111 above. In order to assess annual changes in the observed values using a unified standard, the observed values are normalized similarly to the objective assessment indexes described above, to give indexes such as, for example, "number of recognized criminal offenses per 10,000 inhabitants".

For example, an observed value of the characteristic information "number of recognized criminal offenses" for year t (for example, 2013) of "11,536 cases" and an observed value for year t−1 (for example, 2012) of "12,965 cases" are acquired from the characteristic information table 31 illustrated in FIG. 2 for the local government body AAA City. The observed value of the characteristic information "population" for year t (for example, 2013) of "1,440,124 people" and the observed value for year t−1 (for example, 2012) of "1,431,409 people" are also acquired. The inter-annual assessment index calculation section 123 then calculates a number of recognized criminal offenses per 10,000 inhabitants for year t of "80.10 cases" and a number of recognized criminal offenses per 10,000 inhabitants for year t−1 of "90.58 cases". The observed values of year t and year t−1 are respectively similarly normalized for the other assessment criteria.

Next, at step S132, the inter-annual assessment index calculation section 123 uses the normalized observed value for year t of "80.10 cases" and the normalized observed value of year t−1 of "90.58 cases" to calculate an inter-annual assessment index as expressed by, for example, the equation below.

inter-annual assessment index=observed value (year $t-1$)/observed value (year $t$)=90.58/80.10=1.13

Inter-annual assessment indexes are calculated for each local government body and for each assessment criteria by performing the above processing for each local government body. When calculation of the inter-annual assessment indexes for each assessment criterion has finished for all of the local government bodies, processing returns to the information presentation processing illustrated in FIG. 10.

Next, at step S14 of the information presentation processing illustrated in FIG. 10, the selection section 13 selects at least one local government body having characteristics similar to those of the information presentation target local government body from out of all of the local government bodies, based on the respective assessment indexes of the local government bodies calculated at steps S11, S12, and S13 above. For example, the selection section 13 generates vectors having values of the assessment indexes of respective assessment criterion as elements, for each local government body. The selection section 13 then selects the local government bodies for which the degree of similarity (for example, a degree of cosine similarity) between the vector of the information presentation target local government body and the vector of another local government body is at a predetermined specific value or greater. Moreover, a specific number of local government bodies may be selected in sequence starting from that with the highest degree of similarity. Note that a local government body having characteristics similar to those of the information presentation target local government body may be selected using clustering analysis or a self-organizing map.

Next, at step S15, the presentation section 14 cross-references the presentation information table 34 stored in the presentation information storage section 22, and acquires various presentation information such as success cases and failure cases from when the local government body selected at step S14 above made decisions in the past. The presentation section 14 then presents the acquired presentation information to the user by, for example, displaying on a display device (not illustrated in the drawings), or outputting from a printer (not illustrated in the drawings), connected to the information presentation device 10, and ends the information presentation processing.

As explained above, the information presentation device according to the first exemplary embodiment calculates assessment indexes reflecting the characteristics of each decision making entity, for each assessment criterion, and selects a decision making entity having characteristics similar to those of the information presentation target decision making entity based on the assessment indexes. Information related to decision making by the selected decision making entity is then presented. Accordingly, useful information that accords with the characteristics of a decision making entity can be presented when a decision is made by the decision making entity.

Experiences, or success cases and failure cases from when decisions were made in the past by a decision making entity having similar characteristics are useful information that can advance administrative management, and by referencing this information it is expected that a decision making entity would be able to effectively make decisions on, for example, administrative management.

Moreover, subjective assessment indexes that set a target value and a minimum standard (goal posts) set for each decision making entity according to the characteristics of the decision making entity are employed as one of the assessment indexes, thereby enabling assessment indexes that are based on the goals and strategies of the decision making entity to be calculated. Moreover, objective assessment indexes for assessing relative superiority with respect to another decision making entity group, and inter-annual assessment indexes for assessing changes over time in the assessment criteria, are also calculated as assessment indexes. Performing assessment from three viewpoints in this manner enables the characteristics of a decision making entity to be ascertained in consideration of targets, strategies, inter-annual trends, and the like, and enables multifaceted assessment of the decision making entity.

Moreover, since various information from past decisions made by a decision making entity having similar characteristics is presented as presentation information, this becomes useful information when the decision making entity is making a decision, such as when setting observation targets or self-benchmarks. Setting a decision making entity having similar characteristics as a self-benchmark enables the comparison and assessment of the performance of organizational management. Clarifying the factors involved when there is a large deviation from a benchmark in the assessment results can be expected to contribute to improvements during a PDCA cycle of the organizational management.

Moreover, when there are sufficiently many decision making entities having similar characteristics, this means there are many decision making entities sharing the same factors or dilemmas. Namely, it can be made clear that there is a sufficiently large demand for a solution that resolves the dilemma. In such cases, were an enterprise that has discovered a business opportunity in providing a solution to exist, then research and development may be actively promoted in order to capture the business opportunity. Thus, it can be expected that solutions to dilemmas faced by each decision making entity will be provided, and that management will be improved. Classifying the decision making entities makes it easy to ascertain a "sufficiently great need" that provides the impetus for the improving management.

Although explanation has been given regarding a case in which assessment indexes are also calculated for other decision making entities when calculating the assessment indexes of the information presentation target decision making entity in the first exemplary embodiment, there is no limitation thereto. For example, the calculation of assessment indexes and classification can be performed in advance for each decision making entity registered in the characteristic information table 31. In such cases, the assessment indexes of the information presentation target decision making entity are calculated when the identification information of the information presentation target decision making entity is input into the information presentation device 10. The pre-classified group that the information presentation target decision making entity corresponds to may be determined based on the assessment indexes thereof.

Although explanation has been given regarding a case in which a local government body is given as an example of a decision making entity, and supplementary information focused on the economy, society, and environment thereof is employed as characteristic information in addition to the basic information in the first exemplary embodiment, there is no limitation thereto. For example, technology disclosed herein may also be applied to other decision making entities such as communities and enterprises. Moreover, in such cases, characteristic information may employ appropriate information capable of representing the characteristics of the decision making entity according to the type of decision making entity.

It is conceivable that, for example, information representing sustainability of a decision making entity may be employed as characteristic information. For example, the following equation, which employs an environmental valuation, a societal valuation, a fiscal valuation, and an environmental impact of a decision making entity, may conceivably be employed as characteristic information representing sustainability.

$$\text{sustainability of city} = V_{total}/B_{total}$$

Where, $V_{total} = \Sigma w_i V_i$ and $B_{total} = \Sigma g_j B_j$. Herein, a valuation of the decision making entity is denoted $V_i$, weight coefficients are denoted $w_i$, valuation categories are denoted i, and the summed valuations of the decision making entity is denoted $V_{total}$. Moreover, an environmental impact of the city is denoted $B_j$, weight coefficients are denoted $g_j$, environmental impact categories are denoted j, and the summed environmental impacts is denoted $B_{total}$.

The environmental valuation preferably includes at least land, water, and atmosphere criteria in order to implement more appropriate assessment methods. The societal valuation preferably includes at least housing, food, traffic, safety, education, medical care, and government criteria. The fiscal valuation preferably includes at least finance, employment, and individual economic power criteria. It is conceivable that climate change related criteria, resource recycling related criteria, and biodiversity related criteria may also be included in the environmental impact. Specific examples of these criteria are illustrated in FIG. 14 and FIG. 15.

In such assessments, a coefficient database storing coefficients such as weight coefficients for each criteria, and a criteria information database storing information such as categories, may be provided to a storage section accessible by the information presentation device 10. Values stored in these databases can then be appropriately changed by an assessor, thereby increasing convenience.

Moreover, in the inter-annual assessment index calculation processing illustrated in the flowchart of FIG. 13, changes with time or changes before and after an event may also be computed by similar processing, rather than just simple annual changes. For example, the extent of the effect of a given event or policy on the sustainability of a decision making entity can be assessed by computing sustainability before and after a given event or policy introduction, and making a comparison.

Explanation is given here regarding an example of assessing the sustainability of a decision making entity with respect to changes before and after an event. As an example of assessing the valuations and environmental impact of a decision making entity and computing sustainability, it is conceivable to assess the introduction of a new information system to a local government body. Due to the introduction of the information system, large gains in operational efficiency may be realized by reducing the total cost of ownership (TCO) of the system, enhancing work efficiency, and shifting to a paperless system. Additional environmental improvements may also be anticipated.

The inventors applied an effect estimation method to the introduction of the information system described above for a given local government body having staff of 952 people and an amount of $CO_2$ emissions of 833 t-$CO_2$, and estimated the effect of the introduction. As a result, an obtained effect was an apparent increase of 47 people to the staff of 952. Another obtained effect was an expected decrease in the amount of $CO_2$ emissions by 106 t-$CO_2$ to 727 t-$CO_2$, due to reductions in paper and electric power consumption resulting from the introduction of the information system. An increase in staff is an example of a valuation criterion that improves the quality of government services, and $CO_2$ emissions are an example of an environmental impact index. Moreover, taking a ratio of these two indexes enables the any change in the sustainability of the decision making entity to be estimated. Such an assessment is important to the decision making entity when ascertaining the effectiveness of a policy.

When changes with time or before and after an event are computed using the processing illustrated in the flowchart of FIG. 13, calculated values of sustainability before and after the introduction of the information system above may be employed as observation values at step S131. The calculation process for the inter-annual assessment index at step S132 may be computed similarly to the other cases described above.

Moreover, when information is presented, the presentation section 14 may present the assessment indexes of each assessment criterion for the decision making entity having characteristics similar to those of the information presentation target decision making entity, in combination. For example, trends with time are made clear when inter-annual assessment indexes are presented. Thus, when the assessment criteria of a decision making entity itself exhibit worsening trends, it can be expected that the management of another decision making entity having similar characteristics will be used as reference information to identify the cause and propose a solution. Moreover, when assessment criteria of the decision making entity itself exhibits improving trends, the cause of success is registered in the presentation information table 34. Thus, information related to the cause of success for the decision making entity itself can be presented to another decision making entity having similar characteristics when the other decision making entity becomes an information presentation target decision making entity.

Second Exemplary Embodiment

Figure 16:
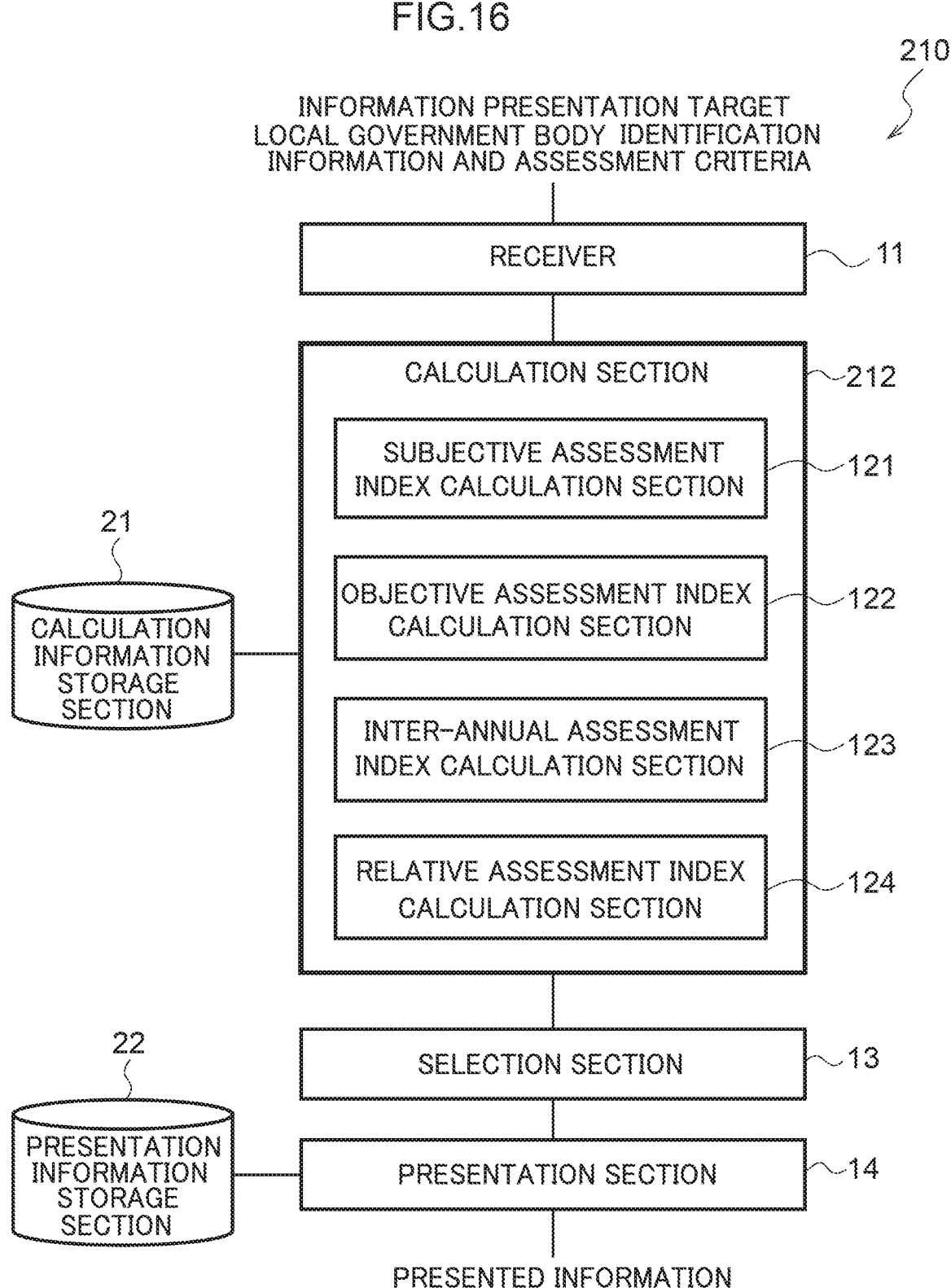
FIG. 16 is a functional block diagram illustrating a schematic configuration of an information presentation device according to the second exemplary embodiment.

Next, explanation follows regarding a second exemplary embodiment. As illustrated in FIG. 16, an information presentation device 210 according to the second exemplary embodiment includes a receiver 11, a calculation section 212, a selection section 13, and a presentation section 14. Only the configuration of the calculation section of the information presentation device 210 according to the second exemplary embodiment differs from that of the information presentation device 10 of the first exemplary embodiment, and explanation of the calculation section 212 therefore follows.

As illustrated in FIG. 16, the calculation section 212 includes a subjective assessment index calculation section 121, an objective assessment index calculation section 122, an inter-annual assessment index calculation section 123, and a relative assessment index calculation section 124. The subjective assessment index calculation section 121 calculates a subjective assessment index for each assessment criterion received by the receiver 11. The objective assessment index calculation section 122 calculates an objective assessment index for each assessment criterion. The inter-annual assessment index calculation section 123 calculates an inter-annual assessment index for each assessment criterion. The relative assessment index calculation section 124 calculates a relative assessment index (described in detail below) for each assessment criterion. Namely, a subjective assessment index, an objective assessment index, an inter-annual assessment index, and a related assessment index are respectively calculated for each assessment criterion. The subjective assessment index calculation section 121, the objective assessment index calculation section 122, and the inter-annual assessment index calculation section 123 are similar to those of the first exemplary embodiment, and detailed description therefore follows regarding the relative assessment index calculation section 124.

The relative assessment index calculation section 124 calculates, for each assessment criterion, a relative assessment index that is an assessment index for assessing relative positions of observed values for the calculation target local government body with respect to the distribution of observed values for all of the local government bodies. The relative assessment index may, for example, be defined as in Equation (8) below.

$$\text{relative assessment index} = (\text{observed value} - \text{national average})/\text{standard deviation} \times 10 + 50 \quad (8)$$

More specifically, the relative assessment index calculation section 124 acquires, from the employed characteristic information table 33, characteristic information to be employed to calculate assessment indexes for each assessment criterion received by the receiver 11. The relative assessment index calculation section 124 then acquires, from the characteristic information table 31, observed values of characteristic information to be employed for all of the local government bodies. The relative assessment index calculation section 124 then calculates an average and a standard deviation of the observed values for all of the local government bodies, and sets the "national average" and the "standard deviation" in Equation (8). The "national average" and the "standard deviation" are calculated for each assessment criterion.

Moreover, the relative assessment index calculation section 124 uses the observed values for the calculation target local government body of the relative assessment index, and the calculated values of the national average and the standard deviation, to calculate relative assessment indexes for each local government body and for each assessment criterion according to Equation (8).

The information presentation device 210 may be implemented by, for example, a computer 40 illustrated in FIG. 9. An information presentation program 250 for causing the computer 40 to function as an information presentation device 210 is stored in a storage section 46 of the computer 40. The CPU 42 reads the information presentation program 250 from the storage section 46, expands the information presentation program 250 into memory 44, and sequentially executes processes included in the information presentation program 250.

The information presentation program 250 includes a reception process 51, a calculation process 252, a selection process 53, and a presentation process 54. The CPU 42 operates as the calculation section 212 illustrated in FIG. 16 by executing the calculation process 252. The other processes are similar to those of the first exemplary embodiment. The computer 40 that executes the information presentation program 250 thereby functions as the information presentation device 210.

Note that the information presentation device 210 may be implemented by, for example, a semiconductor integrated circuit, more specifically, by an ASIC or the like.

Figure 17:
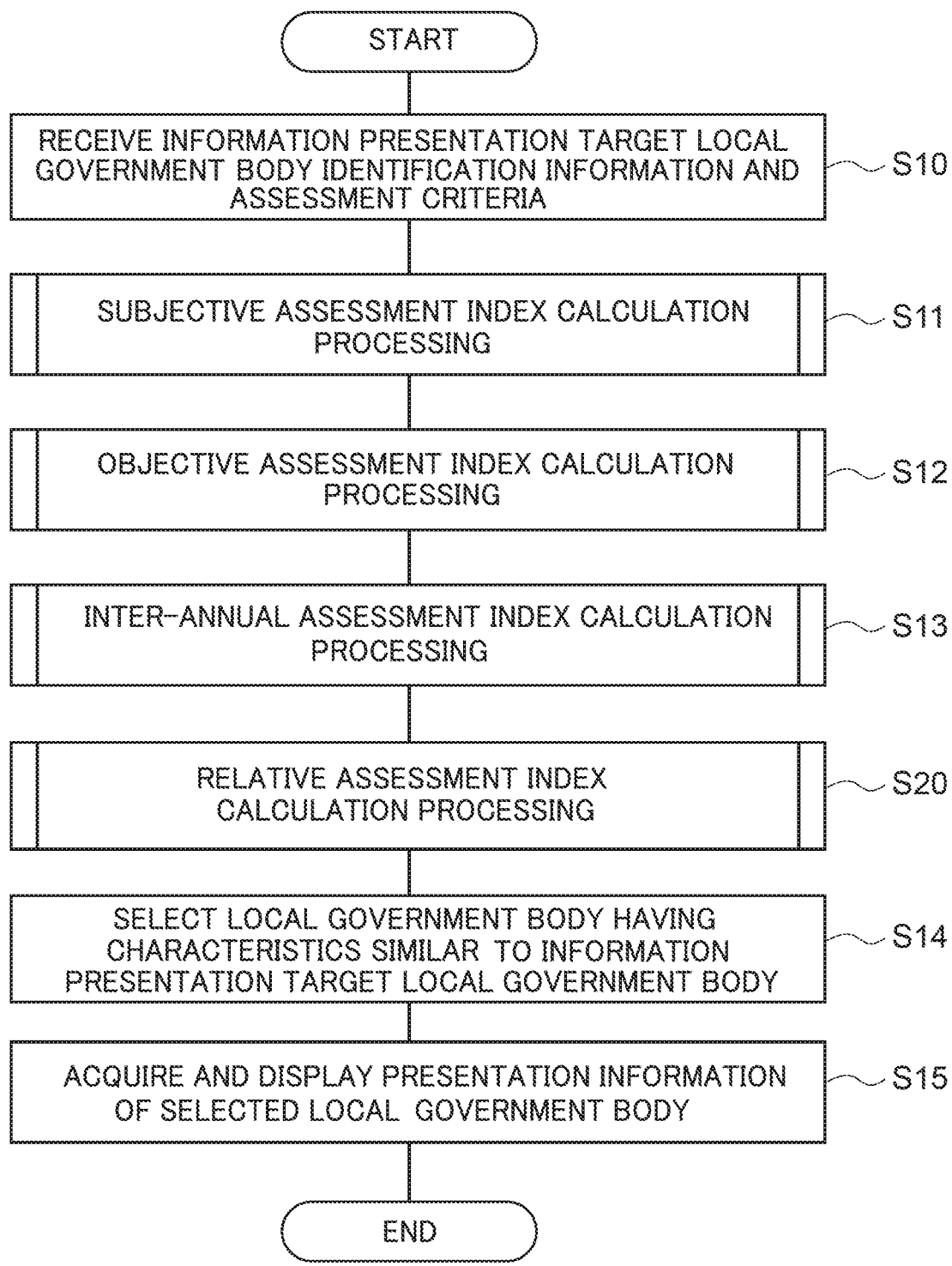
FIG. 17 is a flowchart illustrating information presentation processing according to the second exemplary embodiment.

Next, explanation follows regarding operation of the information presentation device 210 according to the second exemplary embodiment. Similarly to in the first exemplary embodiment, when identification information for the information presentation target local government body and assessment criteria are input to the information presentation device 210, the information presentation processing illustrated in FIG. 17 is executed in the information presentation device 210. The information presentation processing of the second exemplary embodiment differs from the information presentation processing of the first exemplary embodiment (FIG. 10) in that relative assessment index calculation processing is executed at step S20 prior to step S14, and explanation of the relative assessment index calculation processing therefore follows with reference to FIG. 18.

At step S201 of the relative assessment index calculation processing illustrated in FIG. 18, the relative assessment index calculation section 124 acquires, from the employed characteristic information table 33, characteristic information to be used for calculating the assessment indexes of each assessment criterion received by the receiver 11 at step S10 above. For example, "number of recognized criminal offenses" and "population" are acquired from the employed characteristic information table 33 illustrated in FIG. 4 as characteristic information to be used to calculate the assessment index of the "safety/security" assessment criterion.

Next, at step S202, the relative assessment index calculation section 124 acquires, from the characteristic information table 31, the observed values of the characteristic information to be employed for all of the local government bodies. For example, an observed value of the characteristic information "number of recognized criminal offenses" for a given year (for example, 2013) of "11,536 cases" and an observed value of the characteristic information "population" for the given year of "1,440,124 people" are acquired from the characteristic information table 31 illustrated in FIG. 2 for local government body AAA City. Observed values of characteristic information to be employed for the given year are similarly acquired for other local government bodies and other assessment criteria.

Next, at step S203, the relative assessment index calculation section 124 normalizes each observed value acquired at step S202 above for all of the local government bodies such that, for example, "number of recognized criminal offenses per 10,000 inhabitants" is employed for "number of recognized criminal offenses". The relative assessment index calculation section 124 then calculates an average of the normalized observed values for all of the respective local government bodies, and sets the "national average". For example, the national average of the "number of recognized criminal offenses per 10,000 inhabitants" is calculated to be "142.21". National averages are similarly calculated for other assessment criteria.

Next, at step S204, the relative assessment index calculation section 124 uses the normalized observed values for all of the local government bodies, and the national average calculated at step S203 above, to calculate a standard deviation for all of the local government bodies, and sets the "standard deviation" of Equation (8). For example, the standard deviation of the "number of recognized criminal offenses per 10,000 inhabitants" for all of the local government bodies is calculated to be "100.55".

Next, at step S205, the relative assessment index calculation section 124 acquires, from the observed values acquired at step S202 above, the observed values of the calculation target local government body of the relative assessment indexes, and normalizes the acquired observed values. For example, a normalized observed value of the "number of recognized criminal offenses" of "80.10 cases (per 10,000 inhabitants)" is calculated when the calculation target local government body is local government body AAA City. The relative assessment index calculation section 124 uses the observed value "80.10" for the calculation target local government body, the national average "142.21", and the standard deviation "100.55" to calculate the relative assessment index as indicated in, for example, the equation below.

$$\text{relative assessment index} =$$
$$-(\text{observed value} - \text{national average})/\text{standard deviation} \times 10 + 50 =$$
$$-(80.10 - 142.21)/(100.55) \times 10 + 50 = 56.18$$

Note that since the assessment indicating the assessment index of the assessment criterion "safety/security" that employs the "number of recognized criminal offenses" decreases as the observed value increases, the reciprocal of Equation (8) above is employed here.

The relative assessment indexes are calculated for each local government body and for each assessment criterion by performing the above processing for each local government body. When calculation of the relative assessment indexes for each assessment criterion has finished for all of the local government bodies, processing returns to the information presentation processing illustrated in FIG. 17.

As explained above, the information presentation device according to the second exemplary embodiment employs relative assessment indexes representing the relative position of a calculation target decision making entity amongst plural decision making entities as assessment indexes for selecting a decision making entity having similar characteristics. For example, determination as to whether there is a large or a small discrepancy between the difference between an observed value for a given decision making entity and an overall average value, and the difference between an observed value for another decision making entity and the overall average value, is influenced by variation in the observed values for the other decision making entities. Thus, when relative assessment indexes are employed, the relative position of a given decision making entity amongst plural decision making entities can be clearly depicted. This enables decision making entities having similar characteristics to be more precisely selected from amongst plural decision making entities. Accordingly, useful information that accords with the characteristics of a decision making entity can be presented when a decision is made by the decision making entity.

Although explanation has been given regarding a case in which subjective assessment indexes, objective assessment indexes, inter-annual assessment indexes, and relative assessment indexes are all employed in the second exemplary embodiment, there is no limitation thereto. The relative assessment indexes may be used alone, or the relative assessment indexes may be employed in combination with at least one of the other assessment indexes. Whichever of the assessment indexes is employed, vectors having values of the respective assessment indexes of each assessment criterion as elements or the like may be employed, and the degree of similarity between decision making entities may be calculated, as explained in the first exemplary embodiment.

Although, explanation has been given regarding cases in which, in the first exemplary embodiment, assessment indexes are calculated in the order of the subjective assessment indexes, the objective assessment indexes, and the inter-annual assessment indexes, and in the second exemplary embodiment, assessment indexes are calculated in the order of the subjective assessment indexes, the objective assessment indexes, the inter-annual assessment indexes, and the relative assessment indexes, there is no limitation thereto. Any of the assessment indexes may be calculated first, or calculation may employ parallel processing.

Although explanation has been given above in which the information presentation program 50, 250 is pre-stored (installed) in the storage section 46, the information presentation program 50, 250 may be provided recorded on a recording medium such as a CD-ROM or DVD-ROM.

When an assessment of a decision making entity is made based on a survey of residents as in the related technology above, a decision making entity is not able to make a comparative assessment between itself and another decision making entity. Therefore, appropriate selection of another decision making entity to be referenced in decision making is not enabled by the related technology.

Moreover, CASBEE (registered trademark) for Cities employs a normalization method that uses deviation values in order to combine assessment criteria having different units. Namely, a universal index that does not consider the characteristics of each city is employed. Thus, since assessment results in CASBEE (registered trademark) for Cities are dependent on the scores of other cities, interpretation of the assessment results is difficult when deviation values are estimated using information from cities having different characteristics. For example, when an urban area is compared against a sparsely populated mountainous region, it is conceivable that the sparsely populated mountainous region will have relatively low assessment results relating to the economy and society thereof, while the assessment results relating to the environment thereof will be relatively high. However, since characteristics of local government bodies, such as industrial structure and demographic composition, differ between urban areas and sparsely populated mountainous regions, the problems faced by these local government bodies and the standards for respective policy objectives will also differ. It is, therefore, difficult to offer a uniform interpretation for assessment results from CASBEE (registered trademark) for Cities under the premise that the assessment is for the purpose of selecting another decision making entity to be referenced in decision making. Namely, it is difficult to use assessment results from CASBEE (registered trademark) for Cities in order to select, according to the characteristics of the decision making entity, another decision making entity to be referenced in decision making.

Moreover, in the Human Development Index, index normalization is performed using uniform goal posts. It is, therefore, difficult to compare assessments of decision making entities while considering the characteristics of the decision making entities. Namely, it is difficult to use assessment results from the Human Development Index to select, according to the characteristics of the decision making entity, another decision making entity to be referenced in decision making.

As described above, when another decision making entity to be referenced in decision making is not able to be appropriately selected according to the characteristics of a decision making entity, there is the issue that useful information for making a decision according to the characteristics of the decision making entity is not able to be presented.

One aspect of technology disclosed herein has an advantageous effect of enabling presentation of useful information that accords with the characteristics of a decision making entity when a decision is made by the decision making entity.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented information presentation method that acquires and analyzes information from a plurality of respective decision making entities, the method comprising:

receiving, by a processor, a plurality of respective assessment criteria for the plurality of respective decision making entities from a user via an input user interface;

for the respective decision making entities, calculating, by the processor, assessment indexes of the plurality of respective assessment criteria, based on characteristic information representing a characteristic of each of the decision making entities;

selecting, by the processor, from the plurality of decision making entities, at least one decision making entity having a characteristic similar to that of a target decision making entity based on an assessment index calculated for each of the decision making entities;

acquiring, by the processor, information related to decision making by the selected decision making entity from a storage section storing information related to decision making for each of the plurality of decision making entities; and presenting, by the processor, the information related to the decision making by the selected decision making entity to the user via an output user interface.

2. The method of claim 1, wherein a value representing a degree of discrepancy between a target value set for each of the decision making entities according to the characteristics of the decision making entities, and an observed value, is calculated as one of the assessment indexes.

3. The method of claim 1, wherein a value representing a degree of discrepancy between an observed value for a calculation target decision making entity that is a target of calculation for an assessment index, and a standard value statistically obtained from each of the observed values of the decision making entities included in a decision making entity group that includes a decision making entity other than the calculation target decision making entity, is calculated as one of the assessment indexes.

4. The method of claim 3, wherein:
the decision making entity group is a collection of decision making entities having specific characteristic information similar to that of the calculation target decision making entity; and
the standard value is an average value, a maximum value, a minimum value, or a mode value of observed values for the decision making entities included in the decision making entity group.

5. The method of claim 1, wherein a value representing a change over time in the observed value is calculated as one of the assessment indexes.

6. The method of claim 1, wherein a value representing a position, in a distribution of observed values for the plurality of respective decision making entities, of an observed value of a calculation target decision making entity that is a target of calculation for an assessment index, is calculated as one of the assessment indexes.

7. The method of claim 1, wherein, selecting the at least one decision making entity comprises selecting a decision making entity having an assessment index for which a degree of similarity is a specific value or greater.

8. The method of claim 1, wherein selecting the at least one decision making entity comprises categorizing decision making entities using clustering analysis or a self-organizing map based on an assessment index of each of the decision making entities, and selecting a decision making entity in the same category as the information presentation target decision making entity.

9. The method of claim 1, wherein the information related to decision making includes at least one of a success case, a failure case, decision making content, a budget allocation, an organizational framework, or an actual result of decision making when a decision was made.

10. The method of claim 1, wherein, for an environmental valuation, a societal valuation, a fiscal valuation, and an environmental impact held by a decision making entity, when a valuation of the decision making entity is denoted $V_i$, valuation categories are denoted i, a weight coefficient for each valuation category is denoted $w_i$, a summed valuation of the decision making entity is denoted $V_{total}$, an environmental impact of the decision making entity is denoted $B_j$, environmental impact categories are denoted j, a weight coefficient for each environmental impact category is denoted $g_j$, and a summed environmental impact is denoted $B_{total}$, a value representing the sustainability of the decision making entity is computed as the characteristic information in the decision making entity using the equation $V_{total}/B_{total}$ (where, $V_{total}=\Sigma w_i V_i$ and $B_{total}=\Sigma g_j B_j$).

11. The method of claim 10, wherein the environmental valuation includes at least a land criterion, a water criterion, and an atmosphere criterion.

12. The method of claim 10, wherein the societal valuation includes at least a housing criterion, a food criterion, a traffic criterion, a safety criterion, an education criterion, a medical care criterion, and a government criterion.

13. The method of claim 10, wherein the fiscal valuation includes at least a finance criterion, an employment criterion, and an individual economic power criterion.

14. The method of claim 10, wherein the environmental impact includes at least a climate change related criterion, a resource recycling related criterion, and a biodiversity related criterion.

15. An information presentation device, comprising:
a memory configured to store information related to decision making for each of a plurality of decision making entities; and
a processor configured to execute a process, the process comprising:
receiving, by the processor, a plurality of respective assessment criteria for the plurality of respective decision making entities from a user via an input user interface;
for the respective decision making entities, calculating, by the processor, assessment indexes of the plurality of respective assessment criteria, based on characteristic information representing a characteristic of each of the decision making entities;
selecting, by the processor, from the plurality of decision making entities, at least one decision making entity having a characteristic similar to that of a target decision making entity based on an assessment index calculated for each of the decision making entities;
acquiring, by the processor, information related to decision making by the selected decision making entity from the memory; and
presenting, by the processor, the information related to the decision making by the selected decision making entity to the user via an output user interface.

16. A non-transitory recording medium storing an information presentation program executable by a computer to perform a process, the process comprising:
receiving, by a processor, a plurality of respective assessment criteria for the plurality of respective decision making entities from a user via an input user interface;
for the respective decision making entities, calculating, by the processor, assessment indexes of the plurality of respective assessment criteria, based on characteristic information representing a characteristic of each of the decision making entities;
selecting, by the processor, from the plurality of decision making entities, at least one decision making entity having a characteristic similar to that of a target decision making entity based on an assessment index calculated for each of the decision making entities;
acquiring, by the processor, information related to decision making by the selected decision making entity from a storage section storing information related to decision making for each of the plurality of decision making entities; and
presenting, by the processor, the information related to the decision making by the selected decision making entity to the user via an output user interface.

* * * * *